H. LÜBECK.
COUPLING KEY.
APPLICATION FILED FEB. 4, 1919.
1,397,530.
Patented Nov. 22, 1921.
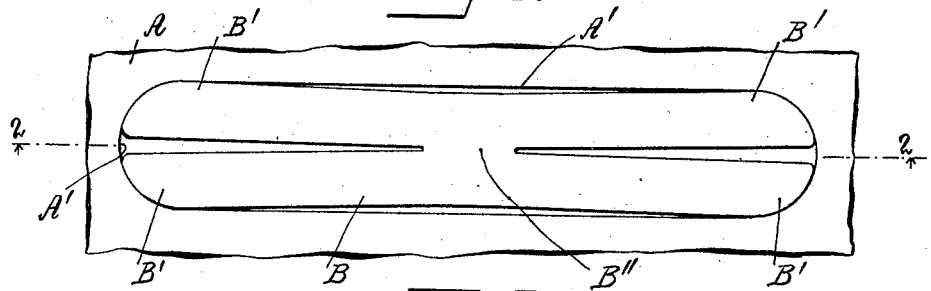
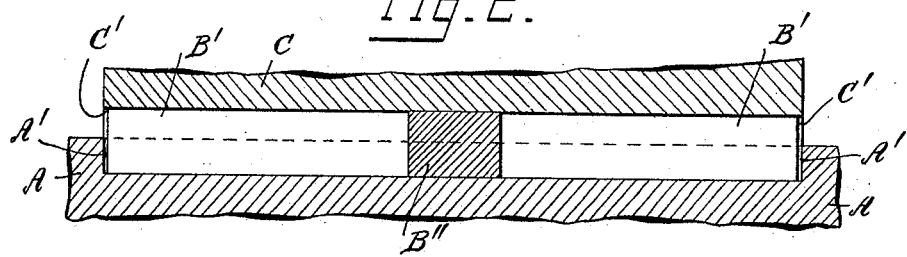
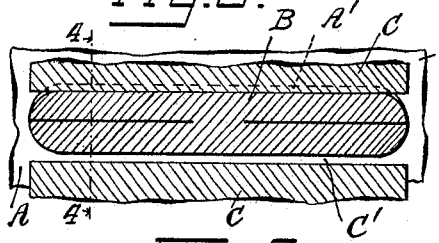
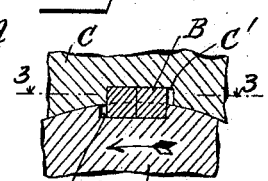
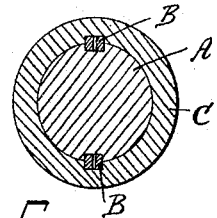
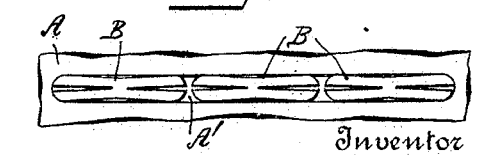
Inventor
Hilding Lübeck
By his Attorney
Albert E. Packer

UNITED STATES PATENT OFFICE.

HILDING LÜBECK, OF HESERUD, SWEDEN.

COUPLING-KEY.

1,397,530.   Specification of Letters Patent.   Patented Nov. 22, 1921.

Application filed February 4, 1919. Serial No. 274,991.

*To all whom it may concern:*

Be it known that I, HILDING LÜBECK, a subject of the King of Sweden, residing at Heserud, Sweden, (at present at Biltmore Hotel, New York city, N. Y.,) have invented certain new and useful Improvements in Coupling-Keys, of which the following is a specification.

This invention relates to keys such as are commonly used for securing gears, pulleys, couplings, or similar machine parts to rotating shafts or the like, so as to compel such machine part to rotate with the shaft. Such keys ordinarily make a rigid connection between the two parts, which is often a disadvantage, especially in gear or similar transmissions where sudden speed variations may take place, or where the resistance may be increased or reduced suddenly, as for instance in the case of automobiles in accelerating or braking, or under the action of springs. The transmission parts are thus subjected to sudden shocks and destructive blows, which may be quite disastrous, especially to the teeth of toothed transmission gears.

It is the object of my present invention to provide means whereby the disadvantages of a rigid key connection will be avoided. This is accomplished by providing an elastic or flexible key, that is, a key which can be compressed to a certain extent and will thus act as a spring. Such compression will permit, between the shaft and the gear or similar machine part connected therewith, a certain amount of displacement in the direction opposite to the direction of rotation, or a torsional yielding, as it may be called. Another advantage of such flexible or yielding key connection in the case of gear transmissions resides in the fact that the gears will adjust themselves automatically, so that the whole active tooth surfaces on the gears will come into contact, and consequently the pressure will be more equally divided and the wear materially reduced.

Several examples of flexible key constructions and several forms of using such constructions have been shown in the accompanying drawings, but it is to be understood that the construction as well as the manner of application of flexible keys may be varied in many different ways, and that I do not wish to be limited by the forms shown.

In these drawings, Figure 1 is a plan view of one form of flexible key, showing the key in its position of rest on one of the two parts to be connected; Fig. 2 is a cross section taken on line 2—2 of Fig. 1, but showing the key in position between the two parts; Figs. 3 and 4 show on a reduced scale a different position of the key with respect to the two machine parts, Fig. 3 being a section taken on line 3—3 of Fig. 4, and Fig. 4 a section on line 4—4 of Fig. 3; Figs. 5, 6 and 7 are views similar to Fig. 1, showing three other forms of suitable key construction; and Figs. 8 and 9 illustrate two additional forms of using my flexible key construction, Fig. 8 being a plan view similar to Figs. 1 and 5 to 7, and Fig. 9 being a cross section similar to Fig. 4.

Referring first to Figs. 1 to 4, A represents one of the connected parts, say a shaft, provided with a suitable socket or slot A′ to receive the key B. This latter, as shown, represents a key of the usual shape, but slitted from both ends toward the middle portion, in the direction of its length, so as to provide tongues B′ which are preferably bent outward so as to normally assume the position shown in Fig. 1. The two tongues on each end of the key are capable of a movement toward each other, and in this manner the key is provided with a certain amount of elasticity in a direction transverse to its length, that is, circumferentially of the shaft. The key socket or slot A′ is preferably made wide enough to receive the key in its normal position, or position of rest, with the tongues bent outward as shown in Fig. 1, so that the rigid central portion of the key will, in this position of the key, be out of contact with both opposing walls of the slot A′.

The key projects beyond the socket A′ and into a slot or keyway C′ of a gear, pulley, or like machine part C to be connected with the shaft A. The slot or keyway C′ is preferably of substantially the same width as the socket A′, and in most cases it will extend from one side of the pulley or gear C to the other, the key being generally of a length corresponding to the width of the pulley, gear or the like to be connected with the shaft.

The operation of my flexible key arrangement is as follows: With the shaft A at rest, the key B will be in its expanded position shown in Figs. 1 and 2. In order to explain the operation clearly, I have indicated in Fig. 4 by an arrow the direction in which I assume the shaft to be rotated, and I will designate the walls of the sockets A', C' located in this figure on the left-hand side of the key as the front walls, and those located on the right-hand side of the key as the rear walls of the sockets. As the shaft now starts to rotate, the rear wall of the slot A' will engage the key and tend to take it along. The gear or pulley C will at first resist such movement, the front wall of the slot C' passing against the key in a direction opposite to the direction of rotation. The key will thus be compressed, the tongues B' being brought toward each other, as shown in Figs. 3 and 4. Owing to the resistance which the key opposes to its compression, there is a certain spring action between the shaft and the part C, and the rotation of the shaft will not be communicated to the part C suddenly, with a shock, as is the case with a rigid key connection, but gradually. After the shaft and transmission parts connected therewith have reached their normal speed, that is, when the load becomes normal, the pressure on the key will be somewhat relaxed, and the latter will assume a slightly expanded position, which will be intermediate between the fully expanded position shown in Figs. 1 and 2 and the fully compressed position shown in Figs. 3 and 4. If there is a sudden change in speed, or if the load or resistance in one of the parts is suddenly increased or decreased, the key will either be compressed or will expand, as the case may be, and will thus effectively prevent shocks, or at least materially soften their effect. Under ordinary working conditions the key would not be fully compressed unless there is a considerable overload placed on the transmission. The compression of the key, as described above, will straighten it out and leave a narrow space in each socket, these spaces extending lengthwise of the socket walls opposite to those between which the key has been compressed (see Figs. 3 and 4).

Instead of being made of one piece of metal, the key shown in Figs. 1 to 4 might consist suitably of two or more pieces, secured together as by welding, riveting or otherwise, or it might be made of say elastic pieces $B^3$ in contact with each other at their end portions and normally out of contact at their center portions, as shown in Fig. 5.

Another form of flexible key has been shown in Fig. 6, in which two key portions $B^4$ are normally held apart by spiral springs D engaging suitable sockets provided in the inner faces of said key portions.

In Fig. 7 I have illustrated a form of flexible key made of a single piece of metal $B^5$, curved so as to normally engage one wall of the key sockets or slots with its central portion and the opposite wall with its end portions. When compressed from both sides, the key will tend to become straight, and the socket must in this case be made sufficiently long to take care of the slight lengthening of the key, which is a consequence of its being straightened out.

In practice, a complete system will be worked out, based on the principle disclosed above, so as to be able to meet the many different requirements, such as different dimensions of transmission means and different loads, with a limited number of flexible keys of standard sizes. It will be realized that the flexibility may be varied, not only by using keys of different strengths and different degrees of elasticity, but in other ways, such as for instance by placing in a slot of a given length, instead of one key, as shown in Figs. 1 to 7, two or more shorter keys arranged end to end in the slot, as shown in Fig. 8. This will of course give a stronger spring action than if one key only is employed.

Another way of obtaining various grades of spring action for different load requirements is to provide two or more key slots on the circumference of the shaft, as shown for example in Fig. 9. Still another way to obtain this result would be to make keys of the same dimensions, but of different degrees of hardness or flexibility. By a suitable combination of the above-mentioned alternatives it will be possible to obtain for any case the desired flexibility.

Various modification may be made without departing from the nature of my invention as set forth in the appended claims.

I claim as my invention:

1. A one-piece key for transmitting motion from one rotary part to another, provided with a rigid central portion and integral longitudinally-split transversely elastic end portions.

2. A structure comprising two parts rotating about the same axis and provided in their adjoining surfaces with corresponding sockets, a key having a portion movable elastically in a direction transverse to the length of the key, and a rigid portion, the width of which is smaller than that of the sockets.

3. A structure comprising two parts rotating about the same axis, and a flexible key engaging both parts to normally compel them to move in unison, but allowing a slight movement of one part relatively to the other in the case of a sudden variation of speed or resistance in one of the parts, said key, when fully compressed, forming of itself a rigid body insuring direct and positive transmission of rotary movement of one part to the other.

4. A structure comprising two parts rotating about the same axis and provided, in their adjoining surfaces, with corresponding sockets forming a single key-way the length of which is parallel to the axis of rotation, and a plurality of circumferentially-yielding keys fitted in the single key-way and arranged to be simultaneously and uniformly compressed incident to relative movement of the two parts.

5. A structure comprising two parts rotating about the same axis, and a flexible key engaging both parts to normally compel them to move in unison, but allowing a slight movement of one part relatively to the other in case of a sudden variation of speed or resistance in one of the two parts, said key having flat faces adapted, upon complete compression of the key, to be brought into facial abutment thereby forming a rigid body insuring direct and positive transmission of rotary movement of one part to the other part.

6. A structure comprising two parts rotating about the same axis, one of said parts having a socket parallel to the axis of rotation, and a key connected with the other part and having a portion projecting into said socket, said key being elastic and curved lengthwise of the socket, and having a tendency to straighten out while transmitting power.

7. A structure comprising two parts rotating about the same axis, one of said parts having a socket, a key connected with the other part and having a portion projecting into said socket, said key being elastic circumferentially of said parts and occupying, during the normal transmission of power, a position intermediate between its fully relaxed and fully stressed positions, whereby during normal transmission of power said key may either increase or decrease its state of elastic tension according as the driving pressure or resistance increases or decreases.

In testimony whereof I affix my signature in presence of two witnesses.

HILDING LÜBECK.

Witnesses:
ALBERT E. PARKER,
S. L. WHITMAN.